Sept. 27, 1966  R. M. MORRIS  3,275,285
THERMOELECTRIC VALVE
Filed Sept. 23, 1963  2 Sheets-Sheet 1
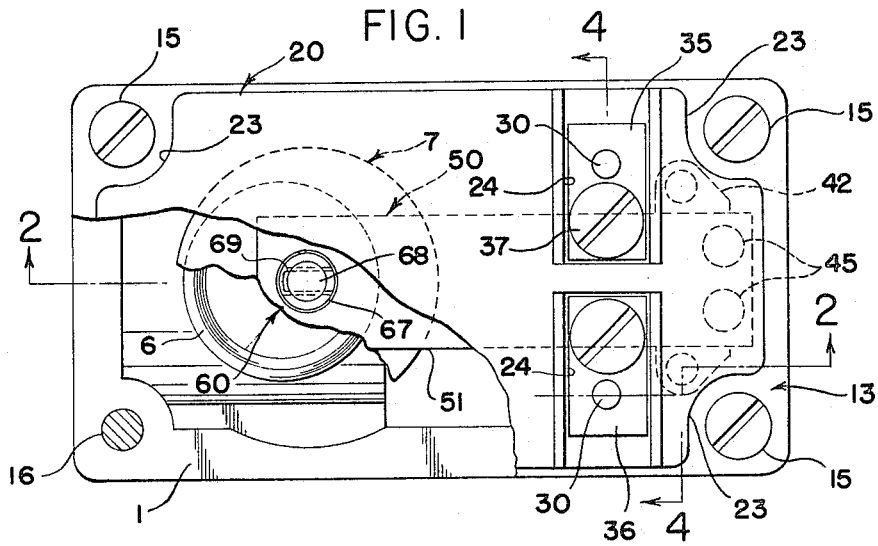
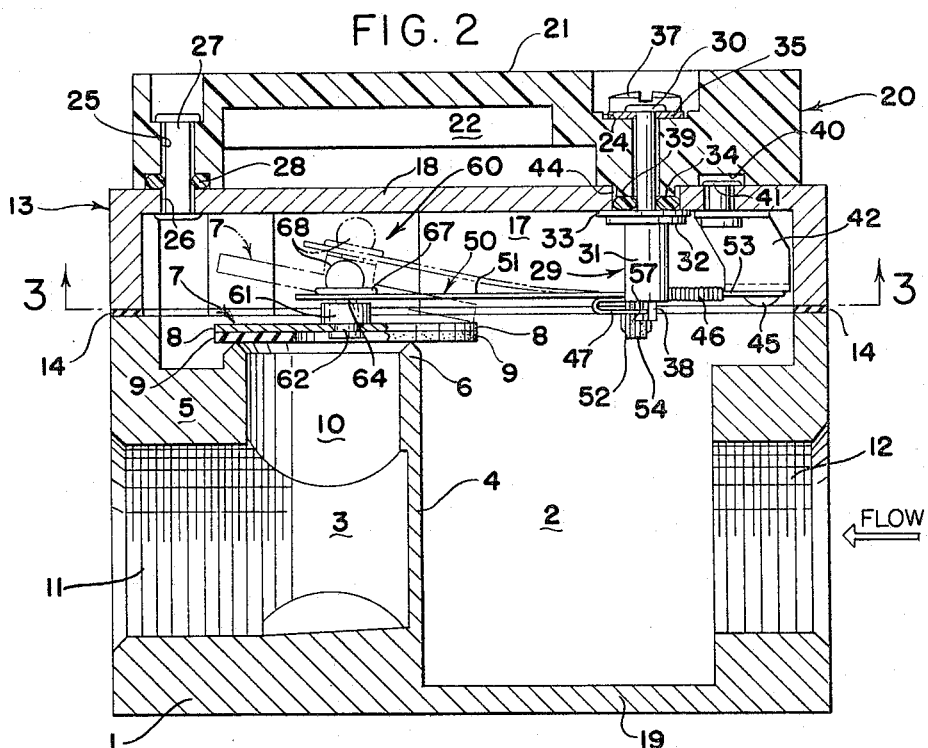
INVENTOR.
REXFORD M. MORRIS
BY
McCoy, Greene, Medert, & TeGrotenhuis
ATTORNEYS

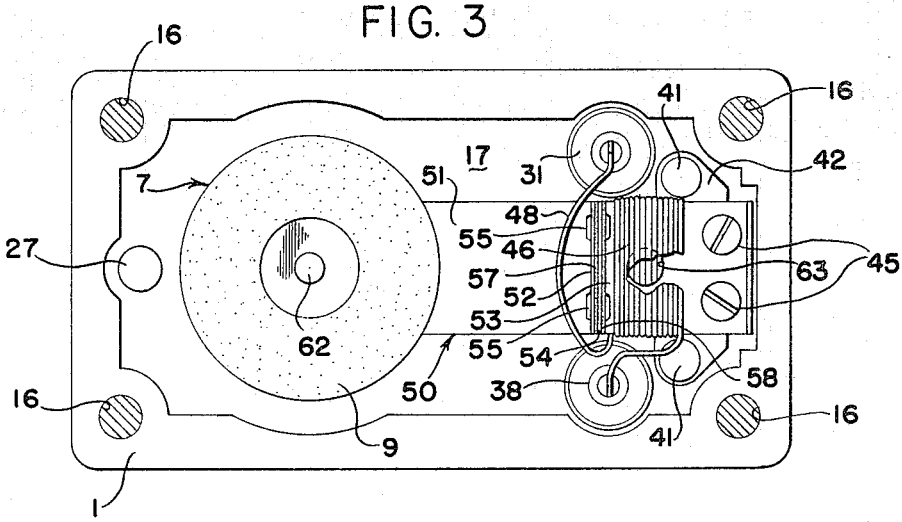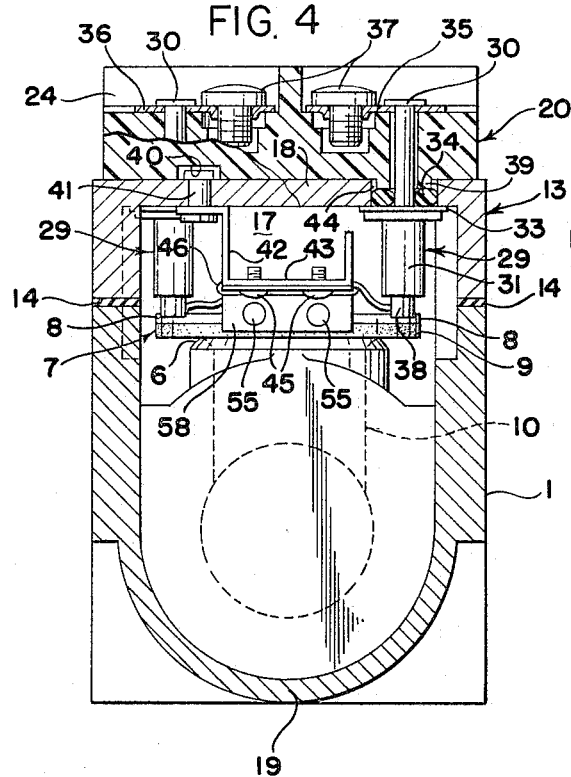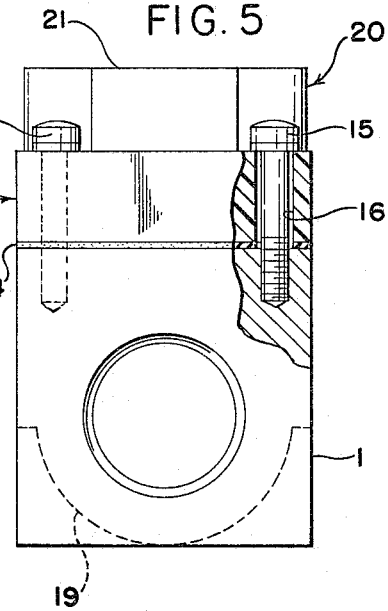

United States Patent Office 3,275,285
Patented Sept. 27, 1966

3,275,285
THERMOELECTRIC VALVE
Rexford M. Morris, Mansfield, Ohio, assignor to Therm-O-Disc, Incorporated, Mansfield, Ohio, a corporation of Ohio
Filed Sept. 23, 1963, Ser. No. 310,704
7 Claims. (Cl. 251—11)

The present invention relates to a thermoelectric gas valve and more particularly to a gas valve assembly having an electrically heated bimetallic arm supporting a novel valve arrangement which functions in an improved manner.

Heretofore, solenoid-operated gas valves have been considered the most practical for household furnaces, but have been complex and costly and have had a number of other disadvantages. Other constructions of a more simple design have been proposed but they did not function reliably or effectively and were not used extensively. Controls designed for use in household furnaces are not deemed satisfactory unless they are capable of operating over long periods of time and at many different ambient temperatures and pressures.

Thermoelectric gas valves have been known for many years (see, for example, U.S. Patent No. 2,583,795) but have been complex and expensive and less desirable than modern solenoid-operated gas valves.

The present invention involves the use of bimetallic members for actuating a valve member in a novel valve assembly for controlling the flow of gas to a household gas furnace. The use of bimetallic members to open and close electric switches is well known in the art, and attempts have been made to use such members to open and close valve elements; however, it was difficult to build up sufficient force in the bimetal arms to overcome the line-pressure which acted to maintain the valve member in closed position. Large bimetal members capable of providing sufficient force to operate a valve not only occupied too much space but were slow acting due to the time required to effect temperature changes in the bimetal. For these and other reasons, the use of electrically heated bimetallic elements in gas valves did not appear to be feasible.

The present invention overcomes the objectionable features of bimetallic actuated valve assemblies and permits replacement of conventional solenoid-operated gas valves with a structure simple in design at a relatively lower cost. The assembly of this invention employs a valve casing having a narrow knife-like valve seat, a flat valve member substantially larger than the opening at said seat and offset with respect to the seat, an electrically heated bimetallic cantilever mounted arm for raising and lowering said valve member and an offset swivel connection between said valve member and the free end portion of said arm. The offset arrangement causes the valve to be first separated from the valve seat at one point on the periphery of the seat and to pivot about the diametrically opposite part of the seat, thereby minimizing the force necessary to open the valve thereby permitting use of a relatively small bimetallic cantilever mounted arm which may be heated and cooled rapidly.

Although the assembly of this invention is relatively simple and inexpensive to manufacture, it is consistent and reliable in operation, is not affected by normal changes in ambient temperature and has been satisfactorily operated in excess of 100,000 cycles. Unlike the solenoid actuators, which require a spring to effect closing of the valve, the assembly of this invention functions without a spring. The desirable snap-action opening and closing movement is obtained by utilizing the line gas pressure without the necessity for complicated structures. Because the assembly is simple, it is easy to assemble or disassemble and the parts may easily be repaired or replaced.

An object of the invention is to provide a high quality electrically-operated gas valve for a household furnace which may be manufactured at a relatively low cost.

A further object of the invention is to provide simple thermoelectrically-operated means for opening and closing a gas valve with minimum time delay.

Another object of the invention is to provide a structure which requires reduced force to unseat the valve element of a gas valve and yet provides proper seating of the valve member on the valve seat.

A still further object of the invention is to provide a durable inexpensive thermoelectric valve which has a relatively long useful life.

Another object is to provide an electrically heated bimetallic activator for the valve element of a gas valve which is not affected by changes in ambient temperature and which cools rapidly when the flow of electric current is terminated.

These and other objects, uses and advantages of the invention will become apparent to those skilled in the art from the following detailed description taken in conjunction with the accompanying drawings wherein like reference characters throughout denote corresponding parts:

FIGURE 1 is a top view on an enlarged scale with parts broken away and shown in section illustrating a thermoelectric valve assembly embodying the invention;

FIGURE 2 is a vertical longitudinal sectional view taken generally along the line 2—2 of FIGURE 1 and on the same scale, the open position of the valve member being shown in dot-dash lines;

FIGURE 3 is a horizontal sectional view taken substantially on the line 3—3 of FIGURE 2;

FIGURE 4 is a transverse vertical sectional view of the valve assembly, on the same scale as FIGURES 1 to 3, with parts broken away and shown in section and with parts omitted;

FIGURE 5 is an end elevational view of the valve assembly on a smaller scale with parts broken away and shown in section; and FIGURE 6 is a fragmentary vertical sectional view showing the swivel connection between the cantilever-mounted arm and the valve member.

Referring more particularly to the drawings, which are drawn to scale to facilitate an understanding of the invention, there is shown in FIGURES 1 and 2 a valve casing 1 having an inlet passage 2 and an outlet passage 3 separated by a flat vertical wall portion 4. The top of the outlet passage 3 is separated from the upper valve chamber 17 by the top wall portion 5 of the casing and the flat valve member 7, which rests on the circular knife edge of the circular valve seat 6, said seat having an inverted V-shaped cross section as shown in FIGURE 2 to provide a fulcrum means for facilitating tilting of the valve member 7. Said valve member comprises a flat circular metal valve disc 8, and a flat annular rubber disc 9 of uniform thickness bonded to the disc 8 for engagement with the valve seat 6, the disc 8 having a diameter materially greater than that of the valve seat and being offset with respect to said seat as shown in FIGURES 1 and 2 to facilitate opening movement of the valve.

A cylindrical vertical passage 10 is provided below the valve seat to conduct gas for the furnace through the outlet passage 3 to a conduit (not shown), which would be mounted in the threaded outlet 11. The inlet 12 is similarly threaded to receive an inlet conduit for supplying gas to the casing 1. The casing 1 is generally rectangular in shape and is detachably connected to a generally rectangular cover 13, which has a flat bottom surface disposed parallel to the flat upper marginal surface of the valve casing for engaging the cork gasket 14. The cover 13 is rigidly and detachably mounted on the valve casing 1 by four mounting screws 15, which extend through the mounting holes 16 of the cover and are screwed into the valve casing as shown in FIGURE 5. The cover defines an upper valve chamber 17 which extends above the chambers 2 and 3, the marginal gasket 14 preventing leakage of gas from the casing. The cover has a flat top wall 18 parallel to the flat bottom surfaces of the casing 1 and parallel to the axis of the semi-cylindrical bottom wall portion 19 of said casing.

A generally rectangular plastic cover plate 20 is rigidly mounted on the cover 13 and has a flat upper surface 21 parallel to the wall 18, a chamber 22 being defined between the wall 18 and the top wall of said plate. The plate 20 has convex rounded corners 23, a pair of rectangular terminal slots 24, and a circular rivet hole 25. A rivet 27 extends through said rivet hole 25 and the rivet hole 26 of the cover to provide a rigid connection between the cover plate 20 and the cover 13, a sealing ring 28 of elastomeric material engaging the circumference of the rivet to prevent leakage.

A pair of vertical terminal pins 29 of circular cross section is employed to connect the other end of the cover plate 20 to the cover 13. Each terminal pin has a rivet portion 30 of reduced diameter, an enlarged intermediate portion 31 having an annular flange 32, and a reduced end portion 38. In order to prevent leakage from the chamber 17 through the circular openings 44 of the cover, each of the terminal pins 29 is provided with a flat dielectric washer 33 and an elastic sealing ring 34, the washer engaging the bottom surface of the wall 18 around the margin of the circular opening 44 and the ring 34 sealingly engaging the cylindrical surface of such opening and the cylindrical external surface of the portion 30.

A pair of flat rectangular terminal plates 35 and 36 is rigidly held in the slots 24 by the rivet portions 30, each terminal plate having a terminal screw 37 for connecting the plate to a temperature-controlled electric wire (not shown). The terminal plates, the terminal screws, and the terminal pins are formed of brass, copper or other suitable electrically conductive material, and the cover plate 20 is formed of a conventional electrical insulating material, such as a synthetic resin used for electrical insulators.

The plate 20 is preferably formed by molding, and has annular projecting portions 39 which extend into the openings 44 to compress the sealing rings 34. The bottom of the plate 20 also has a pair of shallow rivet holes 40 for receiving the heads of a pair of rivets 41 which extend through the wall 18 and through the leg portions of the supporting bracket 42 to provide a rigid connection between the cover 13 and said supporting bracket. The central horizontal portion 43 of said bracket has two internally threaded openings of a size to receive a pair of mounting screws 45 which rigidly connect the bimetallic arm 50 to the bracket 42.

An electric heating means is connected to the terminal plates 35 and 36 to effect heating of the arm 50. As herein shown, such heating means comprises a wire wrapped around the arm to form an electric-resistance heating coil 46 and having its opposite end portions 47 and 48 welded or otherwise connected to the portions 38 of the two terminal pins 29. When an electric current is supplied to the coil 46 in response to a room temperature condition to signal for an opening of the gas valve member 7, the cantilever mounted arm is rapidly heated by said coil and caused to move to an open position as shown in dot-dash lines in FIGURE 2.

The cantilever mounted arm 50 is formed from bimetal strips of uniform width and thickness and comprises an elongated free end portion 51 having a small vertical flange 52 and an anchored portion 53 having a similar flange 54, said flanges having aligned circular openings of a size to receive a pair of rivets 55. A rectangular heat insulating layer 57 is placed between the flanges 52 and 54, and a similar insulating layer 58 is placed between the flange 54 and the heads of the rivets 55 to minimize heat transfer from the portion 53 to the portion 51. Said insulating layers may be formed of asbestos or other suitable material.

The lower layer of the bimetal arm 53 has a coefficient of expansion greater than that of the upper layer so that the arm bends upwardly in a direction tending to unseat the valve member when said arm is heated. The bimetal arm 51 is constructed like the arm 53, but the lower layer has a coefficient of expansion less than that of the upper layer so that it bends in the opposite direction to compensate for changes in the ambient temperature in the valve chamber 17. When the coil 46 is energized to heat the arm portion 53, said arm portion bends upwardly to effect unseating of the valve member. The opening of the valve can be effected with the build-up of relatively small force in the bimetal arm 53 because of the novel offset, pivoted arrangement and can be effected rapidly because of the small volume of metal being heated at the coil 46. When the flow of current to the heating coil 46 is terminated, the valve is closed rapidly because of the rapid cooling of the small bimetal section 53 by the gas flowing through the chamber 17. Location of the section 53 in the gas chamber increases the rate of cooling substantially and reduces the time required to seat the valve member 7 on the valve seat 6.

It is preferable to provide cooling means for the section 53 at the coil 46 to increase this rate of cooling and to protect the coil against damage due to overheating. As herein shown, a circular hole 63 (FIGURE 3) is provided in the section 53 near the center of the coil to effect such cooling.

The bimetal portion 53 of the cantilever arm 50 should bend and provide sufficient force to open the valve without requiring unduly high currents in the coil 46. The bimetal portion 51 is constructed to make this difficult, because heating of the portion 51 by the coil 46 tends to keep the valve closed. It has been found that an ideal compensating arrangement can nevertheless be provided by employing thermal insulation between the portions 51 and 53 to slow down the rate of heat transfer from the heating coil 46 to the portion 51 and by making the portion 51 two to three times as long as the portion 53. The portion 51 may, for example, have a length about 2.4 times the length of the portion 53. Such an arrangement permits opening of the valve with relatively low electrical currents, even though the pressure of the gas in the chamber 17 is relatively high, and also provides an electrically-actuated valve operator which is not affected by changes in the ambient temperature.

The bimetallic cantilever mounted arm 50 used in the assembly of this invention can be heated and cooled quickly because of the small size of the portion 53. A small cantilever arm would be unsatisfactory except for the special construction of the valve which minimizes the force necessary to open and close the valve. A swivel connection 60 is employed between the valve member 7 and the free end portion of the arm 50 to permit tilting of the valve member and to improve the reliability of the valve, which must have a long useful life and must effectively stop the flow of gas when closed. The swivel connection permits the alve to snap open or snap closed. The valve seat 6 is especially constructed to facilitate pivoting of the valve member 7 on the valve seat, and the swivel connection between the valve member and the cantilever arm 50 is offset with respect to the axis of the valve passage 10 to effect such pivotal movement, whereby upward movement of the free end of the cantilever arm 50 overcomes the gas pressure on the valve member 7 holding the valve closed and lifts the portion of the valve member nearest to the fixed end of the bimetal strip 53 to unseat the valve at one part of the seat 6 while the valve member 7 pivots about the diametrically opposite part of the seat farthest from the strip 53, since as shown in FIGURE 2 the point of connection of the valve member and arm 50 is offset from the axis of the valve seat toward the fixed end of strip 53. The offset location of the swivel connection 60 provides a mechanical advantage for effecting opening of the valve while at the same time permitting angular movement of the valve member independently of the angular movement of the arm 50 so that the valve can snap open or closed. When the valve is closed, the axis of the connecting block 61 is preferably spaced from the axis of the valve seat 6 a distance which is 0.1 to 0.3 times the external diameter of the seat at the upper surface thereof.

Various conventional articulated connections may be employed between the valve membr 7 and the arm 50. As herein shown, a swivel connection 60 is provided having a connecting block 61 of circular horizontal cross section rigidly mounted on the valve member. The bottom rivet portion 62 of the block 61 extends through the disc 8 at the center thereof as indicated in FIGURE 2, and the upper portion 64 extends upwardly through a hole 66 in the cantilever arm having a diameter greater than that of the spherical head portion 65 of said connecting block. The swivel connection 60 includes an annular sheet metal button 67 spot welded or otherwise rigidly connected to the upper face of the bimetal strip portion 51 and having a central portion 68 of spherical shape for receiving the head portion 65. A U-shaped retaining pin 69 has two legs which extend through the portion 68 and engage the opposite sides of the portion 64 below the head 65 to prevent movement of said head out of the button portion 67 while permitting the valve member 7 to swivel in any direction.

Although the thermoelectric gas valve of this invention is especially useful as a replacement for solenoid operated gas valves in household heating systems, such valve may readily be adapted for use in gas clothes driers, space heaters and various other devices.

If desired, the parts of the gas valve assembly may be constructed substantially as shown in the drawings, which are drawn to scale, but it will be manifest that the sizes and shapes of the parts may be varied considerably.

It will be understood that the above description is by way of illustration and that, in accordance with the provisions of the patent laws, variations and modifications of the specific devices disclosed herein may be made without departing from the spirit of the invention.

Having described my invention, I claim:

1. A thermoelectric gas valve assembly comprising a valve casing having inlet and outlet passages and valve means between said passages, said valve means comprising a valve seat having a narrow marginal surface located substantially in a horizontal plane and a valve member for resting on said marginal surface, said valve member being constrained on said seat under pressure of gas in the valve casing, a generally horizontal cantilever mounted arm comprising two bimetallic members of substantially different lengths rigidly connected together at their adjacent ends, the shorter member being spaced horizontally from said valve seat, the outer end portion of said shorter member being rigidly mounted on said valve casing and the outer end portion of the longer member being located above said valve member, electrical heating means mounted on said shorter member and insulated from said longer member for heating the shorter bimetallic member and causing it to open the valve when an electric current is supplied thereto, the longer member bending in a direction opposite that of the shorter member in response to an increase in ambient temperature and an articulate connection between said end portion of the longer member and said valve member for causing the valve member to pivot about one side of the valve seat and having its center offset from the central axis of said seat.

2. A thermoelectric gas valve assembly as defined in claim 1 wherein said valve member comprises a flat rigid valve disc having an elastic seat-engaging surface and the connection between said valve disc and said arm comprises swivel means for permitting rotation and pivotal movement of said disc.

3. A thermoelectric gas valve assembly as defined in claim 1 wherein said valve seat has an inverted V-shaped cross section to facilitate tilting of the valve member, said connection comprises swivel means for permitting pivotal and turning movements of said valve member, and said longer bimetallic member has a length about 2 to 3 times the length of said shorter member.

4. A thermoelectric gas valve assembly for an electrically controlled gas furnace comprising a valve casing having inlet and outlet passages in the lower portion thereof and valve means in said casing for controlling communication between said passages, said casing defining a chamber above said valve means and connecting said passages when the valve is open, said valve means comprising an annular valve seat having a knife-like upper surface and a valve member arranged to engage said upper surface throughout the circumference thereof to interrupt communication between said passages, said valve member being constrained on the valve seat by gas under pressure in said chamber, a cantilever mounted arm in the form of a bimetal member which bends in a direction to open said valve in response to an increase in temperature and bends in a direction to close the valve in response to a decrease in temperature, said arm being rigidly connected to said casing at one end and being pivotally connected to said valve member at the other end, the connection between said arm and said valve member being offset a substantial distance from the axis of said valve seat to facilitate opening of the valve, and electrical heating means on said arm for effecting opening and closing of said valve by said arm, said heating means being located in said chamber for cooling by the gas moving through said chamber to the outlet passage.

5. A thermoelectric gas valve assembly as defined in claim 4 wherein said cantilever mounted arm comprises two bimetal members which are rigidly connected together at their adjacent ends and extend in opposite directions from said adjacent ends, one member having a length about 2 to 3 times the length of the other member and being connected to said valve member, the shorter member only being located for heating by said heating means and being fixed at one end to said casing.

6. In a snap-acting thermoelectric gas valve assembly, a valve casing having a lower base portion with inlet and outlet passages and an upper cover portion rigidly mounted on said base portion, said cover portion defining an upper valve chamber located above said passages and serving to connect said passages, valve means in said chamber for controlling communication between said inlet and outlet passages including an annular valve seat in said chamber above said outlet passage and a valve member for engaging the top of said valve seat having a knife-like cross section and providing a pivot for said valve member, a generally horizontal cantilever mounted arm comprising two bimetallic members bent at the adjacent ends to provide narrow flanges and rigidly connected together at said flanges, one member having a length substantially greater than the length of the other member and extending over said valve member, the other bimetal member having its end portion rigidly connected to said cover portion of said casing, electrical resistance heating means mounted on said other member in said chamber and insulated from the longer member for heating the shorter member to cause it to bend and open the valve in a relatively short period of time when an electric current is passed through the heating means, the longer member bending in a direction opposite that of the shorter member in response to changes in temperature to compensate for changes in the temperature of the gas in said chamber, the shorter member and said heating means being located in said upper chamber for cooling by the gas passing from the inlet passage to the outlet passage to return the valve member to said valve seat quickly when the supply of electric current to said heating means is discontinued, means providing an offset swivel connection between the end portion of the longer bimetal member and said valve member to cause the valve member to pivot about one side of the valve seat as it is raised and lowered, said last-named means causing the valve to open first at the side opposite the pivot and to snap open against substantial gas pressure in said chamber, the gas pressure causing the valve to snap closed when the valve member returns to the seat upon cooling of said shorter bimetal member.

7. In a thermoelectric gas valve assembly for an electrically controlled gas furnace, a valve casing having a lower base portion with inlet and outlet passages and an upper cover portion defining a chamber located above said passages and connecting said passages, said base portion having wall means separating said outlet passage from said inlet passage and said upper chamber, said wall means having an annular horizontal valve seat in said chamber above said outlet passage which defines an opening for establishing communication between said upper chamber and said outlet passage, a flat valve disc for engaging the top of said seat throughout the circumference thereof, the central portion of said valve disc being offset from the axis of said valve seat when the valve is closed, a cantilever mounted arm in said chamber having one end fixed to said cover portion and a free end positioned above said disc, means providing a detachable swivel connection between said free end and the central portion of said disc, said arm being mounted of two bimetal members of different length which bend with changes in temperature, said members being rigidly connected together at their ends and extending in opposite directions, one member having a length about 2 to 3 times the length of the other member, one end portion of the shorter member being rigidly connected to said cover portion and the other end portion of said shorter member bending in a direction to open the valve in response to an increase in temperature, an electrical resistance heating coil in said chamber surrounding the movable portion of said shorter member and spaced from said longer member, a cover plate of electrical insulating material rigidly mounted on the top of said cover portion, and a pair of spaced electrical terminals on said cover plate connected to the ends of the wire forming said coil.

References Cited by the Examiner
UNITED STATES PATENTS

| | | | |
|---|---|---|---|
| 251,125 | 12/1881 | Mehring | 137—398 X |
| 1,780,302 | 11/1930 | Koch et al. | 236—68 X |
| 1,897,497 | 2/1933 | Pirani | 251—11 X |
| 2,583,795 | 1/1952 | Pawelsky et al. | 251—11 |
| 2,731,230 | 1/1956 | Schell | 251—11 |
| 3,092,323 | 6/1963 | Wantz | 236—68 |

FOREIGN PATENTS 473,545  8/1952  Italy.

M. CARY NELSON, *Primary Examiner.*

A. ROSENTHAL, *Assistant Examiner.*